United States Patent
Bacanek et al.

(10) Patent No.: US 9,213,115 B2
(45) Date of Patent: Dec. 15, 2015

(54) ANALOG IN POWER SUPPLY MODULE

(71) Applicant: INOVA, LTD., Grand Cayman (KY)

(72) Inventors: Zeljko Bacanek, Calgary (CA); Timothy D. Hladik, Calgary (CA)

(73) Assignee: INOVA LTD., George Town, Grand Cayman (KY)

( * ) Notice: Subject to any disclaimer, the term of this patent is extended or adjusted under 35 U.S.C. 154(b) by 354 days.

(21) Appl. No.: 13/750,415

(22) Filed: Jan. 25, 2013

(65) Prior Publication Data

US 2013/0188447 A1    Jul. 25, 2013

Related U.S. Application Data

(60) Provisional application No. 61/590,681, filed on Jan. 25, 2012.

(51) Int. Cl.
*G01V 1/06*    (2006.01)
*G01V 1/24*    (2006.01)

(52) U.S. Cl.
CPC ........................ *G01V 1/247* (2013.01)

(58) Field of Classification Search
USPC .......................................................... 367/56
See application file for complete search history.

(56) References Cited

U.S. PATENT DOCUMENTS

| | | | |
|---|---|---|---|
| 4,960,183 A * | 10/1990 | Young, II | 181/107 |
| 5,200,930 A | 4/1993 | Rouquette | |
| 5,495,765 A | 3/1996 | Dykes et al. | |
| 5,515,038 A * | 5/1996 | Smith | 340/853.3 |
| 6,529,443 B2 * | 3/2003 | Downey et al. | 367/76 |
| 6,816,082 B1 * | 11/2004 | Laborde | 340/853.3 |
| 6,933,754 B2 | 8/2005 | Restle | |
| 7,193,932 B2 * | 3/2007 | Chamberlain | 367/76 |
| 7,269,095 B2 * | 9/2007 | Chamberlain et al. | 367/76 |
| 7,535,795 B2 * | 5/2009 | Varsamis et al. | 367/76 |
| 8,380,439 B2 * | 2/2013 | Lagmanson et al. | 702/14 |
| 2006/0013065 A1 * | 1/2006 | Varsamis et al. | 367/76 |
| 2008/0224887 A1 * | 9/2008 | Varsamis et al. | 340/853.9 |
| 2009/0147619 A1 * | 6/2009 | Welker | 367/15 |
| 2011/0029244 A1 | 2/2011 | Lagmanson et al. | |

OTHER PUBLICATIONS

PCT/US13/23172—International Search Report dated Apr. 15, 2013.

* cited by examiner

*Primary Examiner* — James Hulka
(74) *Attorney, Agent, or Firm* — Mossman, Kumar & Tyler PC

(57) ABSTRACT

The present disclosure relates methods and apparatus conducting a seismic survey. The apparatus includes an analog interface and power supply both disposed in a housing. The analog interface is configured to receive analog seismic data from a seismic sensor. The apparatus includes one or more of: (i) an isolation transformer disposed between the power supply and the analog interface and (ii) a analog interface clock configured to synchronized with a power supply clock. The method may include reducing power transmission losses and/or the effect of power supply noise on the seismic signals.

8 Claims, 3 Drawing Sheets

ANALOG IN POWER SUPPLY MODULE

CROSS-REFERENCE TO RELATED APPLICATIONS

This application claims priority from U.S. Provisional Application Ser. No. 61/590,681 filed Jan. 25, 2012, the disclosure of which is fully incorporated herein by reference in its entirety.

FIELD OF THE DISCLOSURE

This disclosure generally relates to conducting a seismic survey using an analog interface and a power supply.

BACKGROUND OF THE DISCLOSURE

Seismic surveys are conducted to map subsurface structures to identify and develop oil and gas reservoirs. Seismic surveys are typically performed to estimate the location and quantities of oil and gas fields prior to developing (drilling wells) the fields and also to determine the changes in the reservoir over time subsequent to the drilling of wells. On land, seismic surveys are conducted by deploying an array of seismic sensors (also referred to as seismic receivers) over selected geographical regions. These arrays typically cover 75-125 square kilometers or more of a geographic area and include 2000 to 5000 seismic sensors. The seismic sensors (geophones or accelerometers) are placed are coupled to the ground in the form of a grid. An energy source, such as an explosive charge (buried dynamite for example) or a mobile vibratory source, is used at selected spaced apart locations in the geographical area to generate or induce acoustic waves or signals (also referred to as acoustic energy) into the subsurface. The acoustic waves generated into the subsurface reflect back to the surface from subsurface formation discontinuities, such as those formed by oil and gas reservoirs. The reflections are sensed or detected at the surface by the seismic sensors (hydrophones, geophones, etc.). Data acquisition units deployed in the field proximate the seismic sensors may be configured to receive signals from their associated seismic sensors, at least partially processes the received signals, and transmit the processed signals to a remote unit (typically a central control or computer unit placed on a mobile unit). The central unit typically controls at least some of the operations of the data acquisition units' and may process the seismic data received from all of the data acquisition units and/or record the processed data on data storage devices for further processing. The sensing, processing and recording of the seismic waves is referred to as seismic data acquisition.

The traditional sensor used for acquiring seismic data is a geophone. Multi-component (three-axis) accelerometers, however, are more commonly used for obtaining three-dimensional seismic maps compared to the single component sensors seismic surveying layouts using multi-component sensors require use of more complex data acquisition and recording equipment in the field and a substantially greater bandwidth for the transmission of data to a central location.

A common architecture of seismic data acquisition systems is a point-to-point cable connection of all of the seismic sensors. Typically, output signals from the sensors in the array are collected by data acquisition units attached to one or more sensors, digitized and relayed down the cable lines to a high-speed backbone field processing device or field box. The high-speed backbone is typically connected via a point-to-point relay fashion with other field boxes to a central recording system, where all of the data are recorded onto a storage medium, such as a magnetic tape.

Seismic data may be recorded at the field boxes for later retrieval, and in some cases a leading field box is used to communicate command and control information with the central recording system over a radio link (radio frequency link or an "RF" link). Even with the use of such an RF link, kilometers of cabling among the sensors and the various field boxes may be required. Such a cable-system architecture can result in more than 150 kilometers of cable deployed over the survey area. The deployment of several kilometers of cable over varying terrain requires significant equipment and labor, often in environmentally sensitive areas.

Traditionally, seismic sensors generate analog signals that are converted into digital signals by an analog-to-digital converter and then recorded by a recording device. Some devices in the field may receive power from power supplies configured to boost voltage to reduce transmission losses. The analog-to-digital converter is usually located a distance away (10 to 100 meters) from boost power supplies in order to limit the effect of power supply noise on the analog-to-digital conversion and the analog signals. When the power supply is too close, noise may rise to the level of interference. Interference occurs when noise from the power supply alters the output of the analog-to-digital converter. Separating the analog-to-digital converter from the boost power supply increases the number of pieces of equipment that must be deployed for a seismic survey. Additionally, maintaining a significant distance between the analog-to-digital converter and the boost power supply increases the transmission distances between some pieces of equipment. This distance often results in power transmission losses that reduce the amount of power available from the power supply for operating other devices. This disclosure addresses the need for reduced power losses while maintaining a low noise environment for analog-to-digital signal conversion.

SUMMARY OF THE DISCLOSURE

In aspects, the present disclosure is related to methods and apparatuses for conducting a seismic survey using an analog interface located in proximity to a power supply.

One embodiment according to the present disclosure includes a system for conducting a seismic survey, comprising: at least one seismic sensor configured to supply an analog signal; a housing configured to receive: an analog-to-digital converter in electrical communication with the at least one seismic sensor; and a power supply configured to supply power to at least one seismic device other than the analog-to-digital converter; and a recording computer configured to receive a digital output from the analog-to-digital converter.

Another embodiment according to the present disclosure includes a method for conducting a seismic survey, comprising: reducing power supply noise on a seismic signal where the seismic signal undergoes analog-to-digital conversion on a device positioned in the same housing as a power supply.

Another embodiment according to the present disclosure includes a method for conducting a seismic survey, comprising: performing a seismic survey using a system, the system comprising: a housing configured to receive: an analog to digital converter in electrical communication with the seismic sensor; and a power supply configured to supply power to at least one seismic device other than the analog-to-digital converter; a seismic sensor configured to supply an analog signal to the analog-to-digital converter; and a recording computer configured to receive a digital output from the analog-to-digital converter.

Another embodiment according to the present disclosure includes a method for conducting a seismic survey, comprising: reducing power transmission losses between a power supply and at least one seismic device while maintaining a power supply noise level on seismic signals undergoing analog-to-digital conversion below a selected threshold.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

The present disclosure relates to devices and methods for conducting seismic survey activities relating to seismic data acquisition. The present disclosure may be implemented in embodiments of different forms. The drawings shown and the descriptions provided herein correspond to certain specific embodiments of the present disclosure for the purposes of explanation of the concepts contained in the disclosure with the understanding that the present disclosure is to be considered an exemplification of the principles of the disclosure, and is not intended to limit the scope of the disclosure to the illustrated drawings and the description herein. A description for some embodiments for conducting a seismic survey follows below.

Figure 1:
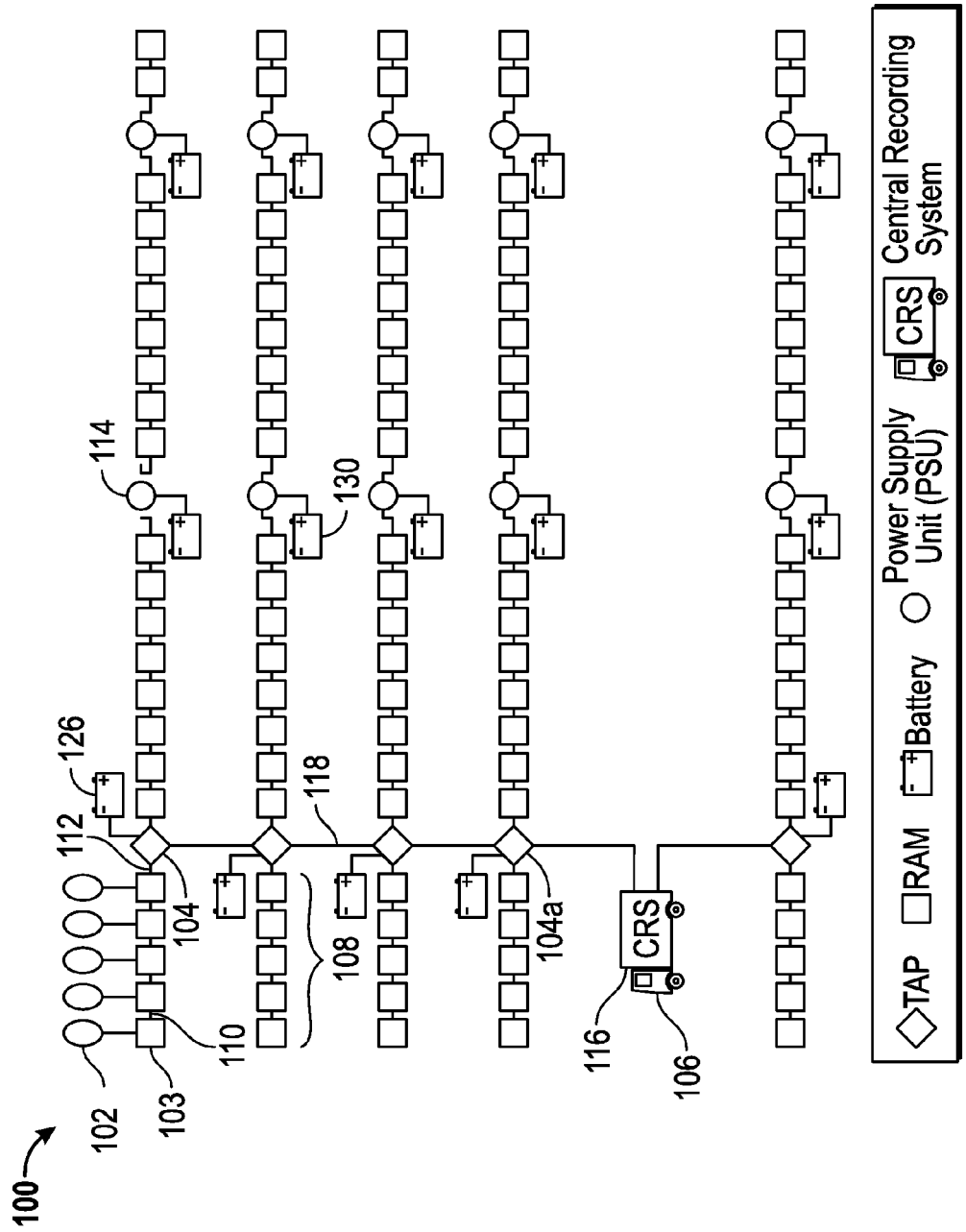
FIG. 1 shows a schematic of a seismic survey system according to one embodiment of the present disclosure.

FIG. 1 depicts an embodiment of a cable seismic data acquisition system 100. The cable seismic data acquisition system 100 includes a seismic source (not shown) providing acoustic energy waves into the earth surface and a plurality of interconnected seismic devices distributed across an earth surface at intervals. The system includes an array (string) of spaced-apart seismic sensor units 102. The seismic sensor units are coupled to at least one seismic device through cabling. The seismic sensor units provide seismic signals to the plurality of seismic devices in response to detected reflections from the acoustic energy waves. The system also includes a central recording system receiving telemetry data from one or more of the plurality of seismic devices through the data communication device. Such a system includes an array (string) of spaced-apart seismic sensor units 102. Seismic sensors units 102 may include, but are not limited to, one more of: geophones and hydrophones. Each sensor 102 is typically coupled via cabling to a data acquisition device (such as remote acquisition module (RAM) 103), and several of the data acquisition devices and associated sensors are coupled via cabling 110 to form a line or group 108. The group 108 is then coupled via cabling 112 to a line tap (such as fiber TAP unit (FTU) 104). Cable 112 may include, but is not limited to, one or more of: (i) copper conductors and (ii) fiber optic cable. Several FTUs 104 and associated lines 112 are usually coupled together by cabling, such as shown by the baseline cable 118. Baseline cable 118 includes fiber optic cable.

A RAM 103 may be configured to record analog seismic signals that are generated by seismic sensors 102. The RAM 103 may be configured to convert analog signals from the seismic sensors 102 into digital signals. The digitized information may then be transmitted to an FTU 104. Some RAMs 103 are configured to relay signals from other RAMs 103 in group 108, in addition to receiving signal from one or more seismic sensors 102. The digitized information transmitted by the RAM 103 may be augmented with status information. The FTU 104 may be configured to transmit the digitized information to a central recording system (CRS) 106. CRS 106 may be implemented as a seismic recording computer. The seismic recording computer may include an information processor in electric communication with a processor memory an information storage medium. The information storage medium may be a non-transitory computer information storage device such as a ROM, hard disk, optical disk, flash memory, or EEPROM.

In some embodiments, the RAM 103 may be configured to receive programming and/or parameter information downloads from the CRS 106. RAMs 103 generally receive power from another device, such as a power supply unit (PSU) 114 or FTU 104, however, RAMs 103 may be configured to include a battery.

The FTU 104 may be configured to receive digital information from one or more RAMs 103 and retransmit that information to the CRS 106. In some embodiments, retransmitted digital information may be augmented with status information for the FTU 104. The FTU 104 may also be configured to supply power to one or more RAMs 103. FTU 104 may itself receive power from a battery 126 or PSU 114. The FTU 104 may include multiple battery ports so that power may remain uninterrupted to the FTU 104 and any connected RAMs 103 when battery 126 is undergoing replacement.

The PSU 114 includes a power supply and may be configured to transmit power to the RAMs 103. In some configurations, the power from the PSU 114 may be transmitted to the RAMs 103 through the FTU 104. PSU 114 may receive power from a battery 130. The devices involved in seismic data acquisition may be collectively referred to as "seismic devices," which may include, but is not limited to: seismic sensors 102, RAMs 103, and FTUs 104, CRS 106, and auxiliary device 116.

In some embodiments, the RAM 103 and/or the FTU 104 may be used as an auxiliary device 116. An auxiliary device 116 may be configured to operate as a timing device. The auxiliary device 116 may be positioned in a recording truck or other comparable location. In some embodiments, the auxiliary device 116 may be dedicated as a timing device. The auxiliary device 116 may be in communication with baseline cables 118 and configured to the exact timing of the seismic shooting system to ensure that the T-zero is consistent. In some embodiments, the CRS 106 may provide the timing signal. The CRS 106 may be positioned in a recording truck or other comparable location.

In the field, the sensors 102 are usually spaced between 10-50 meters. Each of the FTUs 104 typically performs some signal processing and then stores the processed signals as seismic information. The FTUs 104 may be coupled, either in parallel or in series, with one of the units 104*a* serving as an interface between the CRS 106 and one or more FTUs 104. In the cable system of FIG. 1, data are usually relayed from RAM 103 to the next RAM 103 and through several FTUs 104 before such data reaches the CRS 106.

In a typical configuration, a plurality of RAMs 103 may be laid out in intervals (such as 12 @ 55 meters) and connected to receiver cable lines. The receiver cable lines may also be connected to FTUs 104 and PSUs 114. The PSUs 114 may be laid out in intervals as well. The PSUs 114 may be connected to RAMs 103 in a one-to-one or a one-to-many relationship. The FTUs 104 may be laid out at intersecting points of the receiver line cables 112 and baseline fiber optic cables 118. The FTUs 104 may be connected to other FTUs 104 and/or the CRS 106 via fiber baseline cables 118.

In wireless embodiments, the FTUs 104 may communicate with the CRS 106 using radio frequency transmissions and are typically bandwidth limited. In traditional wireless seismic data acquisition systems, an attribute (physical or seismic) degradation affecting the data quality is typically detected by monitoring (printing and viewing) shot (source activation) records immediately after recording.

Figure 2A:
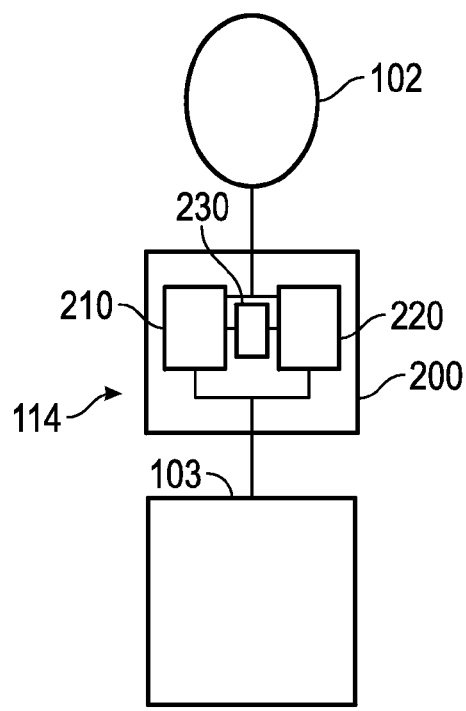
FIG. 2(a) shows a schematic of a PSU with an isolation transformer according to one embodiment of the present disclosure.
Figure 2B:
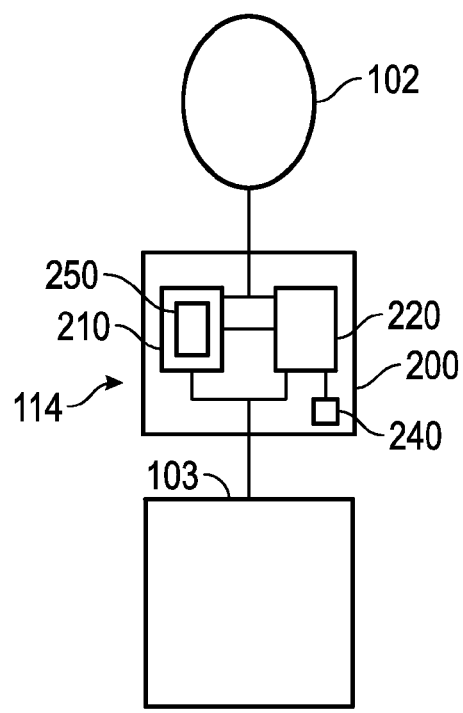
FIG. 2(b) shows a schematic of a PSU with synchronizable clocks in the analog interface and power supply according to one embodiment of the present disclosure.

FIG. 2(*a*) shows a schematic diagram with a PSU 114 that includes an analog interface 210 positioned within housing 200. The PSU 114 may include a power supply 220 configured to convey power seismic devices other than the analog interface 210, such as seismic sensor 102, and/or RAM 103. Alternatively, the housing may be configured to receive the analog interface 210 or components of the interface 210, the power supply 220 or components of the power supply 220, or other components by way of exterior attachment to the housing 200. Power supply 220 is configured to boost the voltage from another power source, such as a battery 130, for use with some seismic devices. The proximity of the power supply 220 to the analog interface 210 (for example, a distance of less than 10 feet (3 meters), less than 3 feet (0.9 meters), or within 12 inches (0.3 meters) as an attached device or within the housing 200 may improve per channel power consumption of a seismic network by reducing the amount of wires needed to power all the analog modules on the seismic network. Thus, the shorter distance between the analog interface 102 and PSU 114 may also reduce the amount of power transmission losses, thus allowing a PSU 114 to supply power for an increased number of devices and/or supply more power to existing devices. Positioning the analog interface 210 within PSU 114 reduces the number of individual pieces of equipment that are deployed in the field for conducting a seismic survey and results greater operating efficiency and lower operating costs.

Although this configuration may reduce power transmission losses, it could also result in the power supply interfering with the analog interface 210. Historically, the power supply 220 has been physically separated from the analog interface for this reason because the interference may alter the output of the analog-to-digital converter and taint the data. Analog interface 210 includes an analog-to-digital converter configured to convert analog signals generated by the seismic sensor 102 into digital signals for recording by the RAM 103. In some implementations, the analog-to-digital converter may be configured with sufficient dynamic range and fidelity to image subsurface formations, The power supply 220 may cause interference with the analog-to-digital converter when electromagnetic field or circuit noise emanating from the power supply 220 rises to a level sufficient to alter the functioning of the analog-to-digital converter. Since the boosting of the voltage by power supply 220 may generate noise, noise countermeasures may be included in the housing. In some embodiments, power supply 220 may be isolated from the analog interface 210 by a transformer 230 configured to reduce the amount of noise from the power supply 220 that reaches the analog interface 210.

FIG. 2(*b*) shows a schematic diagram with a PSU 114 that includes an analog interface 210 positioned within housing 200. The PSU 114 may include a power supply 220 configured to convey power to seismic devices other than the analog interface 210, such as seismic sensor 102, and/or RAM 103. Power supply 220 is configured to boost the voltage from another power source, such as a battery 130, for use with some seismic devices. In other embodiments, the housing may be configured to receive the analog interface 210 or components of the interface 210, the power supply 220 or components of the power supply 220, or other components by way of exterior attachment to the housing 200. Analog interface 210 includes an analog-to-digital converter configured to convert analog signals generated by the seismic sensor 102 into digital signals for recording by the RAM 103. Analog interface 210 may also include a first clock 250, or may be in electrical communication with and receive first clock signals from a first clock 250. Power supply 220 receives a second clock signal supplied by a second clock 240 and operates in dependence upon the second clock signal. Second clock 240 may be located within power supply 220, outside power supply 220 and within housing 200, or at a location external to housing 200. Since the boosting of the voltage by power supply 220 may generate noise, PSU 114 includes a noise reduction circuit. The noise reduction circuit is in electric communication with the first clock and the second clock. The noise reduction circuit configured to synchronize the first clock with a second clock signal supplied to the power supply such that noise from the power supply is reduced to prevent interference. For example, clock 250 may be synchronized with clock 240 to reduce the effect of noise from power supply 220 on the analog signals and/or analog interface 210. The system may be configured so that a power supply noise level and/or the affects of the power supply noise level on seismic signals undergoing analog-to-digital conversion are kept below a selected threshold, such as, for example, an error rate.

In some embodiments, the noise reduction features of FIG. 2(*a*) (e.g. isolation transformer 230) and the noise reduction features of FIG. 2(*b*) (e.g. synchronized clocks 240, 250) may be combined in a single PSU 114.

Figure 3A:
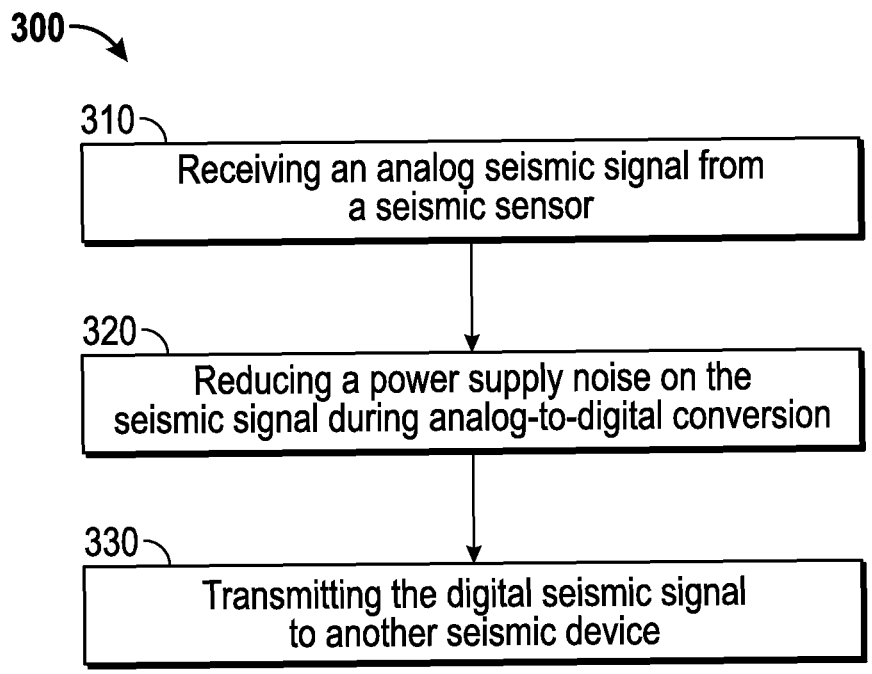
FIG. 3(a) shows a flow chart for a method for one embodiment according to the present disclosure.
Figure 3B:
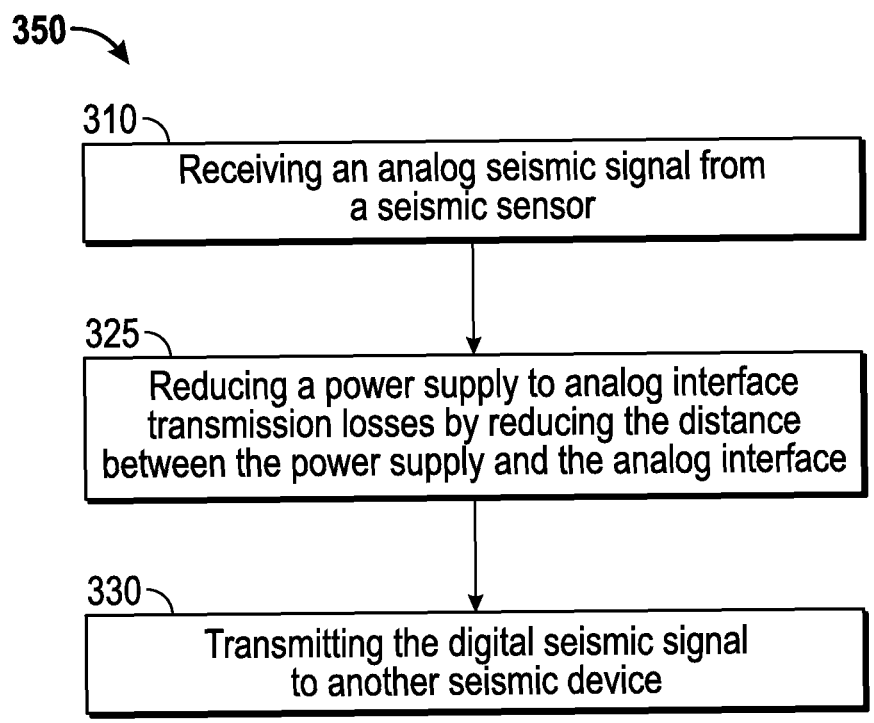
FIG. 3(b) shows a flow chart for a method for another embodiment according to the present disclosure.

FIG. 3(*a*) shows a flow chart 300 for conducting a seismic survey according to one embodiment of the present disclosure. In step 310, an analog seismic signal is received by the analog interface 210 from a seismic sensor 102. In step 320, the effect of noise from power supply 220 on the seismic signal may be reduced during analog-to-digital conversion by the analog interface 210. The effect of noise may be reduced by one or more of: (i) isolating the power supply 220 from the analog interface 210 using a transformer 230 and (ii) synchronizing a clock 250 in the analog interface 210 with a clock signal from a clock 240 supplied to the power supply 220. In step 330, the seismic signal in digital form may be transmitted to another seismic device for recording, further processing, and/or retransmission such as RAM 103.

FIG. 3(*b*) shows a flow chart 350 for conducting a seismic survey according to one embodiment of the present disclosure. In step 310, an analog seismic signal is received by the analog interface 210 from a seismic sensor 102. In step 325, power transmission losses between power supply 220 and analog interface 210 are reduced by reducing the distance between power supply 220 and analog interface 210. In step 330, the seismic signal in digital form may be transmitted to another seismic device for recording, further processing, and/or retransmission.

While the foregoing disclosure is directed to the one mode embodiments of the disclosure, various modifications will be apparent to those skilled in the art. It is intended that all variations be embraced by the foregoing disclosure.

What is claimed is:

1. A system for conducting a seismic survey, comprising:
   at least one seismic sensor configured to supply an analog signal;
   a housing configured to receive:
     an analog-to-digital converter in electrical communication with the at least one seismic sensor; and
     a power supply configured to supply power to at least one seismic device other than the analog-to-digital converter;
   a recording computer configured to receive a digital output from the analog-to-digital converter;
   a first clock in electric communication with the analog-to-digital converter and configured to provide a first clock signal to the analog-to-digital converter; and
   a noise reduction circuit in electric communication with the first clock and receiving a second clock signal, the noise reduction circuit configured to synchronize the first clock with the second clock signal such that noise from the power supply is reduced to prevent interference;
   wherein the power supply is configured to supply power to at least one seismic device other than the analog-to-digital converter in dependence upon the second clock signal supplied to the power supply from a second clock, wherein the power supply is proximate to the analog-to-digital converter such as to produce interference altering the output of the analog-to-digital converter in the absence of noise reduction countermeasures; and
   wherein the second clock resides inside the housing, the distance between the analog-to-digital converter and the power supply is less than 12 inches, and the analog-to-digital converter and the power supply each reside inside the housing; and
   wherein the recording computer is configured to receive a digital output from the analog-to-digital converter and image subsurface geological formations in dependence upon the digital output.

2. The system of claim 1, wherein the at least one seismic sensor includes a geophone.

3. The system of claim 1 further comprising:
   a transformer coupled between the power supply and the analog-to-digital converter to reduce the noise from the power supply.

4. A method of conducting a seismic survey, comprising:
   reducing power supply noise on a seismic signal where the seismic signal undergoes analog-to-digital conversion on a device positioned in the same housing as a power supply, wherein the device is positioned proximate to the power supply such as to produce interference altering the output of the analog-to-digital conversion in the absence of noise reduction countermeasures;
   receiving an analog signal at an analog-to-digital converter in a housing from at least one seismic sensor in electrical communication with the analog-to-digital converter, the signal indicative of reflections of acoustic energy from an earth surface;
   converting the analog signal to a digital signal in dependence upon a first clock signal;
   supplying power to at least one seismic device other than the analog-to-digital converter from a power supply located inside the housing in dependence upon a second clock signal;
   imaging an area below the earth surface in dependence upon the digital output from the analog-to-digital converter; and
   wherein the noise from the power supply is reduced sufficiently to prevent interference.

5. The method of claim 4, further comprising:
   wherein the first clock signal is generated by a first clock in electric communication with the analog-to-digital converter and configured to provide the first clock signal to the analog-to-digital converter;
   synchronizing the first clock with the second clock signal, using a noise reduction circuit, such that noise from the power supply is reduced sufficiently to prevent interference.

6. The method of claim 4, further comprising receiving the second clock signal from a second clock residing inside the housing, and wherein the distance between the analog-to-digital converter and the power supply is less than 12 inches.

7. The method of claim 6, further comprising:
   wherein the first clock signal is generated by a first clock in electric communication with the analog-to-digital converter and configured to provide the first clock signal to the analog-to-digital converter;
   synchronizing the first clock with the second clock signal, using a noise reduction circuit, such that noise from the power supply is reduced sufficiently to prevent interference.

8. The method of claim 6, further comprising:
   isolating the device from the power supply by having a transformer coupled between the power supply and the device to reduce the noise from the power supply on the device.

* * * * *